United States Patent
Chang

(10) Patent No.: US 6,529,294 B1
(45) Date of Patent: Mar. 4, 2003

(54) SECURING DEVICE FOR SCANNER

(75) Inventor: Ching-Chung Chang, Taipei (TW)

(73) Assignee: Silitek Corporation, Taipei (TW)

( * ) Notice: Subject to any disclaimer, the term of this patent is extended or adjusted under 35 U.S.C. 154(b) by 0 days.

(21) Appl. No.: 09/391,479

(22) Filed: Sep. 8, 1999

(51) Int. Cl.⁷ .................................................. H04N 1/04
(52) U.S. Cl. ........................ 358/471; 474/483; 474/497
(58) Field of Search ................................ 358/471, 483, 358/497, 494, 474, 401, 482, 400, 500; 399/211

(56) References Cited

U.S. PATENT DOCUMENTS

| | | | | |
|---|---|---|---|---|
| 5,973,866 A | * | 10/1999 | Tseng | 359/896 |
| 6,247,374 B1 | * | 6/2001 | Tseng | 74/89.22 |
| 6,402,034 B1 | * | 6/2002 | Yeh | 235/472.01 |

* cited by examiner

Primary Examiner—Cheukfan Lee
(74) Attorney, Agent, or Firm—Rosenberg, Klein & Lee

(57) ABSTRACT

A securing device for a scanner is provided which comprises a scanner main body and a relay mechanism. The scanner main body houses an image scanning mechanism driven by a motor unit which is connected to a driving circuit. The relay mechanism is connected between the driving circuit and an external DC power source for supplying electrical power to the image scanning mechanism. The relay mechanism includes an electromagnetic coil and two switches. The electromagnetic coil is connected to the DC power source fed through an insertion hole formed on the scanner main body. The two switches are electrically connected to the driving circuit. The securing device automatically locks the image scanning mechanism when the DC power source does not send electrical power to the relay mechanism. The securing device is operated automatically to secure or unlock the image scanning mechanism of the scanner. Therefore, the securing device for a scanner overcomes such problems as those due to position deviation and motor idling.

3 Claims, 5 Drawing Sheets

SECURING DEVICE FOR SCANNER

FIELD OF THE PRESENT INVENTION

The present invention relates to a securing device for scanner, more particularly to a securing device, which can automatically secure the scanning means of an image scanner.

BACKGROUND OF THE INVENTION

FIG. 1 shows the schematic diagram of a conventional scanner with a securing device. The scanner 60 has an image scanning means 70 driven by a motor module 80, which is powered by an external DC power source. The scanner further comprises a securing device 90 with a securing hole 95. As shown in FIG. 2, the securing hole 95 secures the image scanning means 70 to restrict the movement of the image scanning means 70 when the scanner is not used. When the scanner is to be used, the securing hole 95 is operated manually to unlock the image scanning means 70 whereby the image scanning means 70 can be moved by the motor module 80 for scanning operation.

(1) Since the securing hole is operated manually to unlock the image scanning means, the user may directly operate the scanner without unlocking the image scanning means due to careless mistake. Therefore, the motor will be idled, and possibly damaged due to overheating.

(2) The position of the image scanning means may be deviated because the user does not correctly operate the securing device.

(3) The position of the image scanning means may be deviated due to machancial clearance.

It is an object of the invention to provide an easily used securing device, which is operated automatically, rather than manually, to secure or unlock the image scanning means of the scanner.

It is another object of the invention to provide a securing device for scanner, which is operated to secure or unlock the image scanning means of the scanner to prevent the problem of position deviation and motor idling.

To achieve above object, the present invention provides a securing device for scanner comprising a scanner main body and a relay means. The scanner main body houses an image scanning means driven by a motor unit, the motor unit connected to a driving circuit. The relay means is connected between the driving circuit and an external DC power source for supplying electrical power to the image scanning means. The relay means comprises an electromagnetic coil and two switches. The electromagnetic coil is connected to the DC power source fed through an insertion hole on the scanner main body. The two switches are electrically connected to the driving circuit. The securing device automatically locks the image scanning means when the DC power source does not send electrical power to the relay means.

The various objects and advantages of the present invention will be more readily understood from the following detailed description when read in conjunction with the appended drawing, in which:

DETAIL DESCRIPTION OF PREFERRED EMBODIMENT

Figure 1:
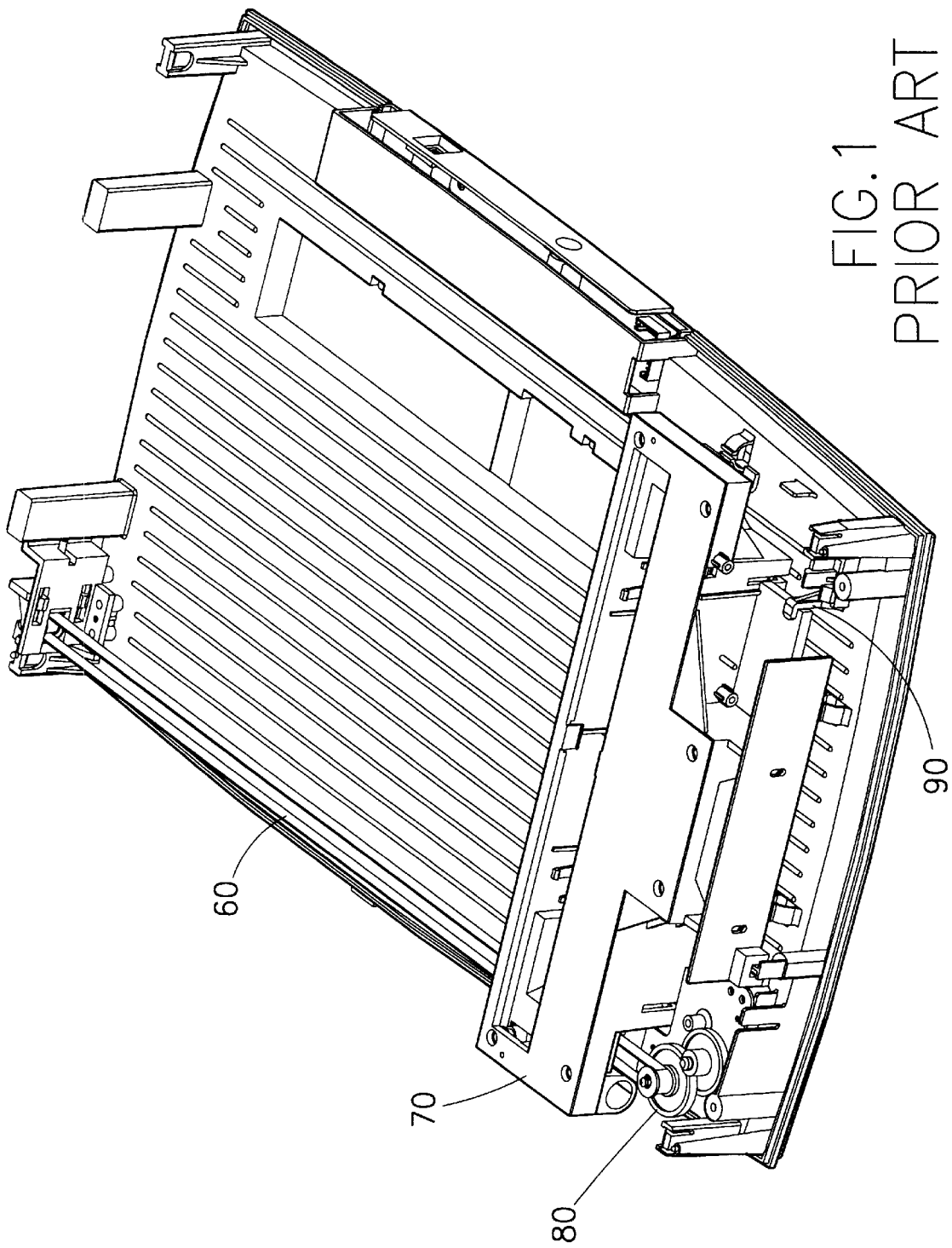
FIG. 1 shows the schematic diagram of a conventional scanner with a securing device.
Figure 2:
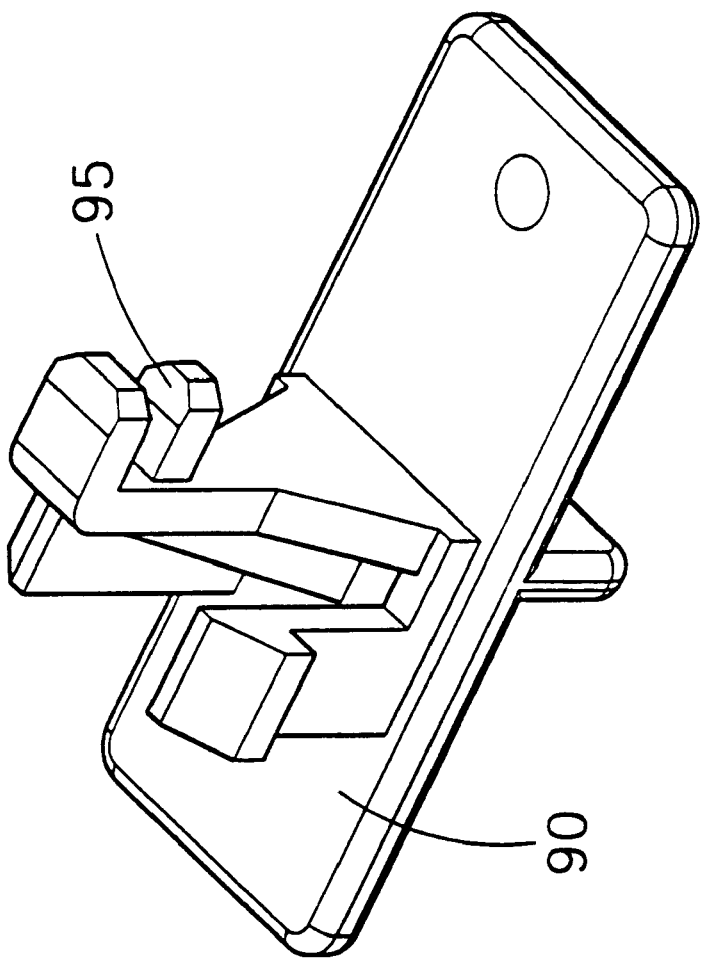
FIG. 2 is a perspective view of the securing device of FIG. 1.
Figure 3:
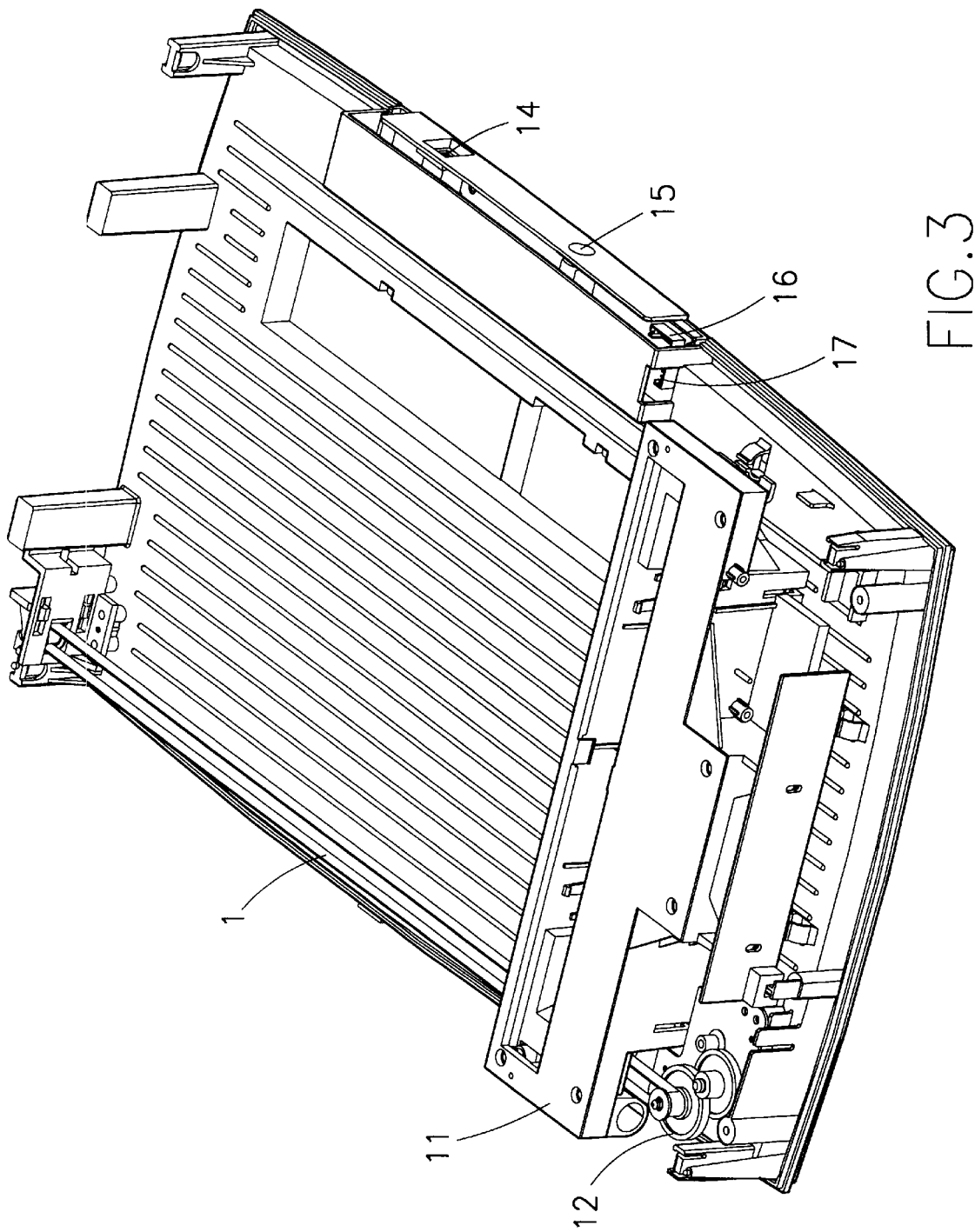
FIG. 3 shows the schematic diagram of the scanner with a securing device according to the present invention.
Figure 4:
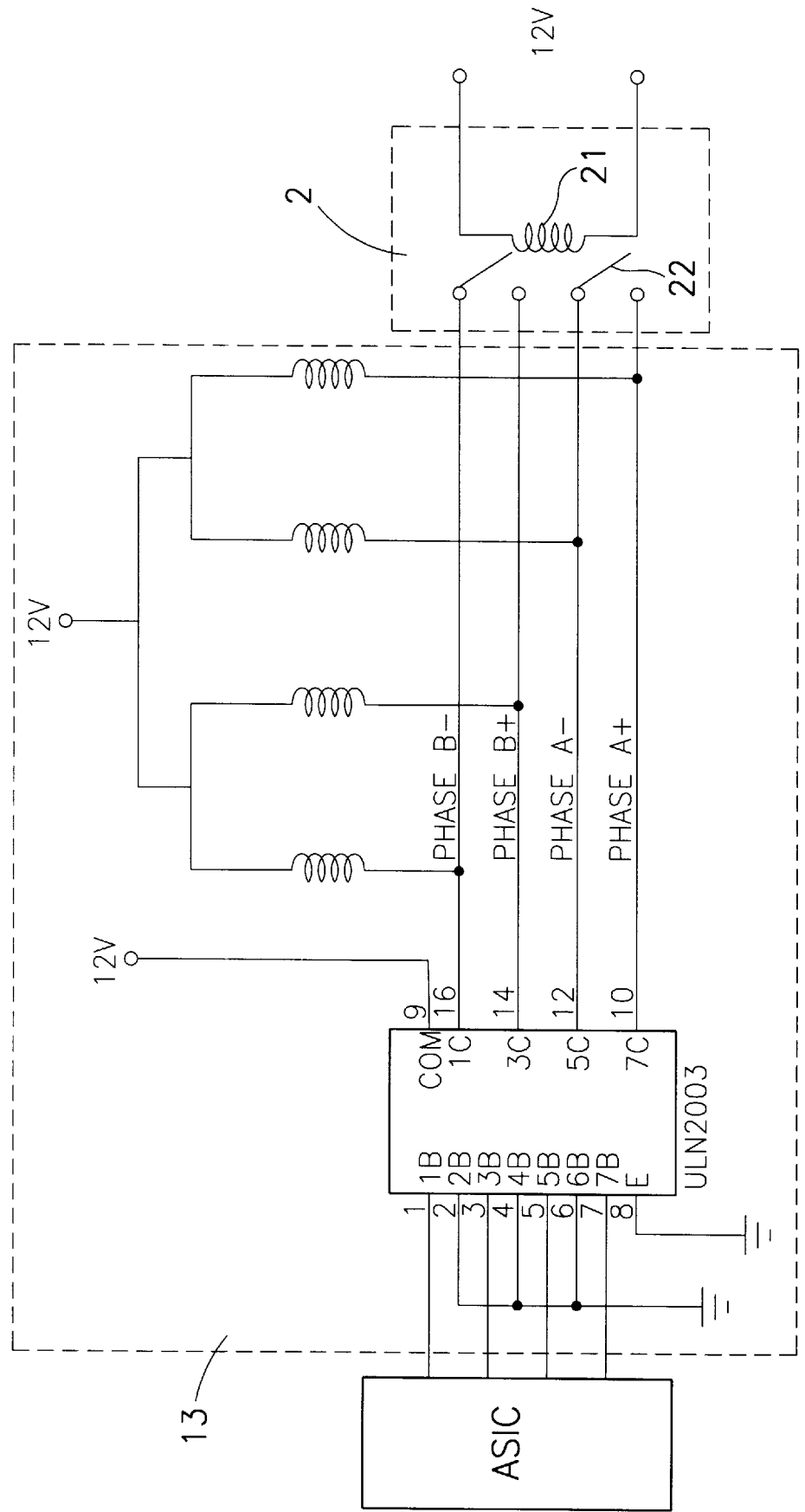
FIG. 4 is the circuit diagram of the securing device according to the present invention; and, FIG. 5 shows the relay in a non-activated state according to the present invention.
Figure 5:
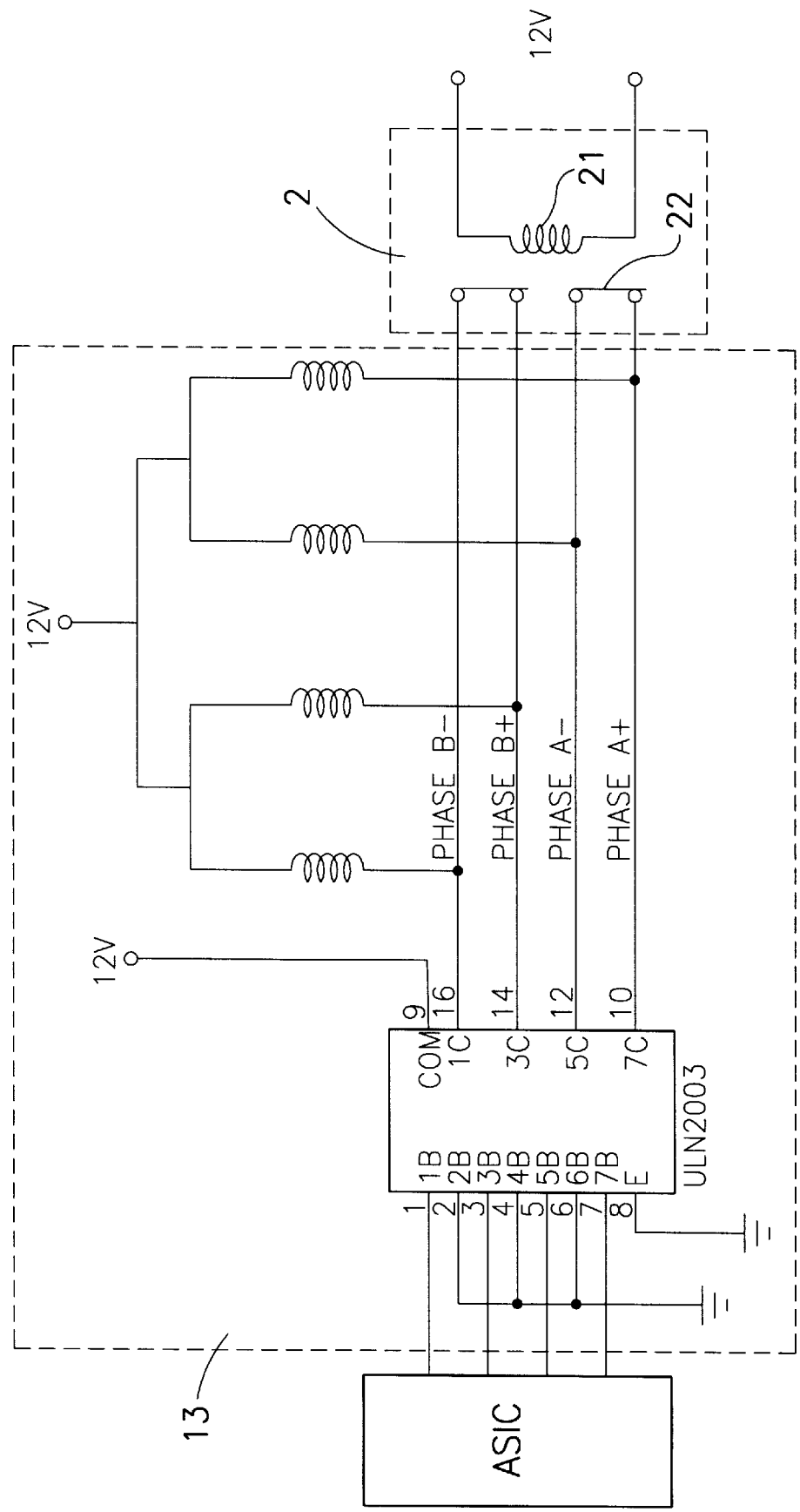

With reference now to FIGS. 3 to 5, the present invention provides a securrring device for scanner, which comprises at least a scanner main body 1, a relay 2.

The scanner main body 1 comprises an image scanning means 11 driven by a motor module 12. The motor module 12 is connected to a driving circuit 13. The scanner main body 1 further comprises a rectangular hole 14 adapted for the connection of a USB (Universal Serial Bus) and an insertion hole 15 adapted for the connection of a DC power source (12V). Moreover, a first socket 16 connected with the motor module 12 and a second socket 17 connected with the image scanning means 11 are provided beside the insertion hole 15.

The relay means 2 comprises an electromagnetic coil 21 and two switches 22. The electrical power is fed via the rectangular hole 14 to the relay means 2. The two switches 22 are connected to the driving circuit unit 13 with a driving IC. The driving IC comprises a transistor array in Darlington configuration. The input of the driving IC is connected to a control signal from an ASIC.

The relay means 2 functions to control the operation of the two switches 22 by the current flowing therethrough. In other words, the relay means 2 drives the two switches 22 in normally-closed state when external electrical power is fed to the relay means 2 through the rectangular hole 14 such that a current is generated through the relay means 2. On the other hand, the relay means 2 drives the two switches 22 in normally-open state when no external electrical power is fed to the relay means 2 through the rectangular hole 14 such that no current is generated through the relay means 2.

As shown in FIG. 4, the relay means 2 drives the two switches 22 in normally-open state when no external electrical power is fed to the relay means 2 through the rectangular hole 14. At this time, the image scanning means 11 can not be driven by the motor module 12 such that the image scanning means 11 is automatically locked.

As shown in FIG. 5, the relay means 2 drives the two switches 22 in normally-closed state when the external electrical power is fed to the relay means 2 through the rectangular hole 14. At this time, the image scanning means 11 is driven by the motor module 12 such that the image scanning means 11 is automatically unlocked.

To sum up, the securrring device for scanner provided by the present invention is operated automatically, rather than manually, to secure or unlock the image scanning means of the scanner. Moreover, the securing device for scanner prevents the problem of position deviation and motor idling.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

I claim:

1. A securing device for scanner, comprising:

a scanner main body housing an image scanning means driven by a motor unit, said motor unit connected to a driving circuit;

an external DC power source for supplying electrical power to said image scanning means; and, at least one relay means connected between said driving circuit and said external DC power source; one said relay means comprising an electromagnetic coil and at least two switches connected to said motor unit; said relay means controlling the operation of said switches by the current flowing through said electromagnetic coil, whereby said securing device automatically locks said image scanning means when said DC power source does not send electrical power to said relay means.

2. The securing device for scanner as in claim 1, wherein said scanner main body comprises an insertion hole through which said DC power source sends electrical power to said relay means.

3. The securing device for scanner as in claim 1, wherein the input of said driving circuit is connected to a pulse signal source.

* * * * *